(12) United States Patent
Suzuki et al.

(10) Patent No.: US 11,467,281 B2
(45) Date of Patent: Oct. 11, 2022

(54) OBJECT DETECTION DEVICE

(71) Applicant: DENSO CORPORATION, Kariya (JP)

(72) Inventors: Yohei Suzuki, Nisshin (JP); Mitsuyasu Matsuura, Nisshin (JP); Taketo Harada, Nisshin (JP); Hirohiko Yanagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 253 days.

(21) Appl. No.: 16/854,023

(22) Filed: Apr. 21, 2020

(65) Prior Publication Data

US 2020/0249347 A1 Aug. 6, 2020

Related U.S. Application Data

(63) Continuation of application No. PCT/JP2018/034876, filed on Sep. 20, 2018.

(30) Foreign Application Priority Data

Oct. 23, 2017 (JP) .............................. JP2017-204513

(51) Int. Cl.
  *G01S 15/46* (2006.01)
  *G06T 7/73* (2017.01)
  (Continued)

(52) U.S. Cl.
  CPC .............. *G01S 15/46* (2013.01); *G01S 15/86* (2020.01); *G01S 15/931* (2013.01); *G01V 1/001* (2013.01);
  (Continued)

(58) Field of Classification Search
  CPC .......... G06V 20/58; G06V 20/56; G01V 8/10; G01V 1/001; G06T 7/73;
  (Continued)

(56) References Cited

U.S. PATENT DOCUMENTS 8,886,387 B1 * 11/2014 Agarwal ................ G06V 20/56
  701/28
2005/0068197 A1 * 3/2005 Regan .................... G08G 1/168
  340/932.2

(Continued)

FOREIGN PATENT DOCUMENTS

JP          3494434 B2    2/2004
JP       2005-318541 A   11/2005
  (Continued)

*Primary Examiner* — Pinalben Patel
(74) *Attorney, Agent, or Firm* — Maschoff Brennan

(57) ABSTRACT

In an object detection device to be installed to a vehicle and detect an object outside the vehicle, a position calculator sets multiple candidate points representing a candidate position of the object, based on positions of feature points extracted from a first image captured at a first time. The multiple candidate points are set to be denser within a detection range set based on a distance to the object detected by the ultrasonic sensor than outside the detection range. The position calculator estimates positions of the multiple candidate points at a second time which is after the first time, based on the positions of the multiple candidate points and movement information of the vehicle, and calculates the position of the object by comparing the estimated positions of the multiple candidate points at the second time and the positions of the feature points extracted from a second image captured at the second time.

12 Claims, 7 Drawing Sheets

(51) Int. Cl.
*G01S 15/86* (2020.01)
*G01S 15/931* (2020.01)
*G01V 1/00* (2006.01)
*G06V 20/56* (2022.01)
*B60R 11/04* (2006.01)

(52) U.S. Cl.
CPC .............. *G06T 7/74* (2017.01); *G06V 20/56* (2022.01); *B60R 11/04* (2013.01); *G06T 2207/30252* (2013.01)

(58) Field of Classification Search
CPC ... G06T 2207/30252; G06T 2207/1002; G06T 2207/30261; G06T 7/74; G01S 15/46; G01S 15/931; G01S 15/86; G01S 15/878; G01S 15/10; B60R 11/04; G01B 21/00; G08G 1/16; G06K 9/6293
See application file for complete search history.

(56) References Cited

U.S. PATENT DOCUMENTS

| | | | | |
|---|---|---|---|---|
| 2005/0231341 | A1* | 10/2005 | Shimizu | G01S 15/86 340/901 |
| 2011/0282581 | A1* | 11/2011 | Zeng | G01S 17/89 701/301 |
| 2013/0215221 | A1* | 8/2013 | Wang | G06T 7/73 348/43 |
| 2014/0062759 | A1* | 3/2014 | Morikawa | G01S 7/4817 342/146 |
| 2015/0103175 | A1* | 4/2015 | Lee | B60R 25/1001 348/148 |
| 2017/0116487 | A1* | 4/2017 | Yamazaki | G06T 7/285 |

FOREIGN PATENT DOCUMENTS

| | | |
|---|---|---|
| JP | 2014-126990 A | 7/2014 |
| JP | 2018-195050 A | 12/2018 |

\* cited by examiner

OBJECT DETECTION DEVICE

CROSS REFERENCE TO RELATED APPLICATIONS

The present application is based on Japanese Patent Application No. 2017-204513 filed on Oct. 23, 2017, the description of which is incorporated herein by reference.

BACKGROUND

Technical Field

The disclosure relates to an object detection device.

Related Art

A technique applicable to vehicle-installed object detection devices is known for detecting an obstacle by Dynamic Stereo that virtually embodies a stereo camera utilizing movement of a camera. Specifically, a known parking assisting device is configured to capture two images before and after movement of a camera and acquires three-dimensional data of an obstacle from a difference between the two images.

DESCRIPTION OF SPECIFIC EMBODIMENTS

Figure 1:
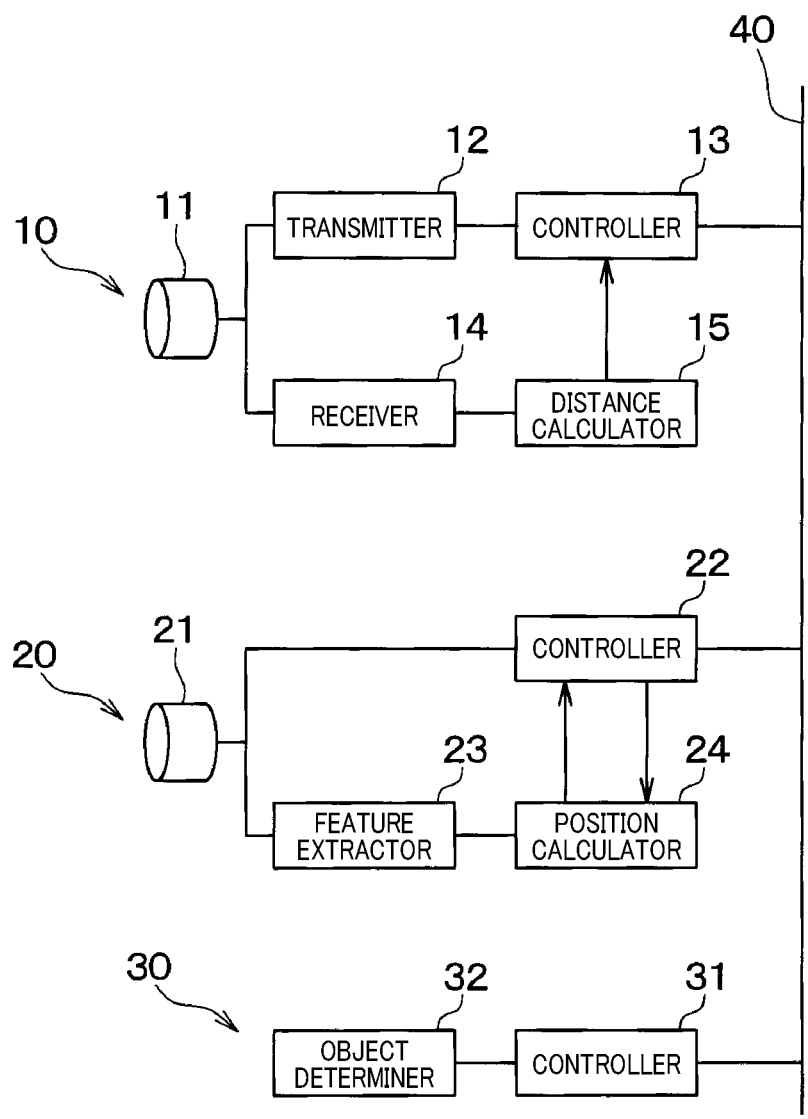
FIG. 1 is a view illustrating a configuration of an object detection device according to a first embodiment.

The known technique, as disclosed in JP-B-3494434, has a high calculational burden because a large amount of image data needs to be processed each time an object detection process is performed.

There is another known technique using an ultrasonic sensor, as an example of a technique for detecting an object by using a device other than a camera. Generally, such a technique accompanies a lower calculational burden than detecting an object by image processing. However, this technique causes lower accuracy in detection than the technique using a camera because detecting the direction in which an object is present, by a single ultrasonic sensor, is difficult.

In view of the foregoing, it is desired to have an object detection device which is capable of detecting an object with higher accuracy while suppressing an increase in calculational burden.

One aspect of the present disclosure provides an object detection device to be installed to a vehicle and detect an object located outside the vehicle. In the object detection device, an ultrasonic sensor is configured to detect a distance to the object by emitting and receiving an ultrasonic wave, and a camera is configured to capture a first image around the vehicle at a first time and a second image around the vehicle at a second time which is after the first time. Moreover, a feature extractor is configured to extract feature points from each of the first and second images, and a position calculator is configured to calculate a position of the object based on positions of the feature points and the distance detected by the ultrasonic sensor. In the object detection device, the position calculator is further configured to: set multiple candidate points based on the positions of the feature points extracted from the first image, the multiple candidate points representing a candidate position of the object, the multiple candidate points being set to be denser within a detection range than outside the detection range, the detection range being set based on the distance detected by the ultrasonic sensor; estimate positions of the multiple candidate points at the second time, based on the positions of the multiple candidate points and movement information of the vehicle; and calculate the position of the object by comparing the estimated positions of the multiple candidate points at the second time and the positions of the feature points extracted from the second image.

It is capable of detecting the direction, in which an object is present, with reference to the positions of feature points in the first image. It is further capable of comparing only the multiple candidate points, which are set in this direction, to the second image, which can lead to a lower calculational burden than in the case of comparing all range in this direction thereto.

Furthermore, a detection range is set based on the distance detected by the ultrasonic sensor, and candidate points are set such that they are denser in the detection range than outside the detection range; the positions close to the distance detected by the ultrasonic sensor are subjected to calculations with high resolution, accordingly. This means, achieving higher accuracy in detection is compatible with suppressing an increase in calculational burden.

Hereinafter, some embodiments of the disclosure will be described with reference to the drawings. In order to facilitate understanding of the description, the same structural elements in the drawings share the same reference signs wherever possible, and overlapping description is omitted.

First Embodiment

A first embodiment will be described. An object detection device according to the present embodiment detects an object that is outside a vehicle, by a vehicle-installed ultrasonic sensor and camera both operating together.

As illustrated in FIG. 1, the object detection device is provided with an ultrasonic sensor 10, an image sensor 20, an electronic control unit (ECU) 30, and an in-vehicle LAN 40. The ECU 30, as well as controllers 13 and 22 and others to be described below, are configured as a well-known microcomputer including a CPU, a ROM, a RAM, an I/O interface, and others, and execute calculational tasks and other various tasks in accordance with programs recorded on the ROM, for example. The ROM and the RAM are non-transitory tangible storage media.

The ultrasonic sensor 10 detects an object by emitting and receiving ultrasonic waves, and is provided with a microphone 11, a transmitter 12, a controller 13, a receiver 14, and a distance calculator 15. In the present embodiment, the object detection device is provided with a plurality of the ultrasonic sensors 10.

The microphone 11 is mounted on an outer surface of a vehicle, and emits, out of the vehicle, ultrasonic waves for detecting an object. Specifically, the microphone 11 is provided with a piezoelectric element not shown in the figure, whose configuration has a piezoelectric film disposed between two electrodes facing each other; and the two electrodes are connected to the transmitter 12. The transmitter 12 supplies an AC voltage to deform the piezoelectric film, and the microphone 11 thereby emits ultrasonic waves from the vehicle.

In the ultrasonic sensor 10, the controller 13 issues radio transmission commands to the transmitter 12 at regular intervals. Upon receiving a radio transmission command from the controller 13, the transmitter 12 makes the microphone 11 emit an ultrasonic wave by transmitting a signal to the microphone 11.

The microphone 11 is further configured to receive ultrasonic waves and output variable voltage depending on the sound pressure of the received ultrasonic waves. Specifically, the two electrodes of the piezoelectric element in the microphone 11 are connected to the receiver 14 as well so that voltage across the two electrodes are input to the receiver 14 when the piezoelectric film is deformed with ultrasonic waves received. The receiver 14 performs A/D conversion on the voltage, which is input by the microphone 11, and outputs signals produced thereby.

The distance calculator 15 calculates the distance to an object using the signals produced by A/D conversion of the receiver 14. Upon input of the signals by the receiver 14, the distance calculator 15 detects the amplitude of the received waves by performing quadrature demodulation of the signals. Subsequently, the distance calculator 15 compares the amplitude of the received waves to a predetermined threshold and calculates the distance to the object based on the period of time from the controller 13 issues a radio transmission command to the transmitter 12 until the amplitude of the received waves becomes the predetermined threshold or higher.

The distance calculator 15 transmits the distance to the object, which is determined by calculation, to the controller 13; the controller 13 transmits the range information, which is transmitted from the distance calculator 15, to the image sensor 20 by way of the in-vehicle LAN 40.

The image sensor 20 captures images around the vehicle and detects an object using the captured images, and is provided with a camera 21, a controller 22, a feature extractor 23, and a position calculator 24.

The camera 21 captures images around the vehicle. The controller 22 is configured to issue an image capture command to the camera 21 upon receipt of the range information from the controller 13 of the ultrasonic sensor 10. Upon receiving an image capture command from the controller 22, the camera 21 captures two images at a time interval. The first and second time the camera 21 performs image capturing are referred to as first and second time, respectively; the images captured around the vehicle at the first and second time are referred to as first and second image, respectively. The camera 21 transmits the obtained image information to the feature extractor 23.

The feature extractor 23 extracts feature points from each of the first and second image. Here, each feature point is a pixel having a feature in brightness. For example, when the difference in brightness between two neighboring pixels is greater than a predetermined value, either one of the two pixels corresponds to a feature point. The feature extractor 23 transmits the positions of the extracted feature points to the position calculator 24.

The position calculator 24 calculates the position of the object based on the positions of the feature points extracted by the feature extractor 23. Specifically, the range information, which is transmitted by the controller 13 by way of the in-vehicle LAN 40 and the controller 22, is input to the position calculator 24; the position calculator 24 calculates the position of the object based on the positions of the feature points and the distance to the object detected by the ultrasonic sensor 10.

The position calculator 24 sets multiple candidate points, representing the candidate positions of the object, based on the pixel position of the feature point extracted from the first image. Candidate points are set to be denser within a region R, which will be later described, than outside the region R. Meanwhile, movement information of the vehicle is transmitted by a vehicle speed sensor or another not shown in the figure, to the position calculator 24 by way of the in-vehicle LAN 40; the position calculator 24 estimates or predicts the positions of the multiple candidate points at the second time, based on the positions of the multiple candidate points and the movement information of the vehicle. Subsequently, the position calculator 24 calculates the position of the object by comparing each estimated position to the position of the feature point extracted from the second image. The position calculator 24 transmits the position of the object, which is determined by calculation, to the ECU 30.

The ECU 30 is provided with a controller 31 and an object determiner 32. The controller 31 performs communication with the ultrasonic sensor 10 and the image sensor 20 via the in-vehicle LAN 40. The object determiner 32 determines whether or not there is an object located at less than a predetermined distance, based on the information transmitted from the image sensor 20. Depending on the result of the determination made by the object determiner 32, the controller 31 provides a notification or other information to the driver via the in-vehicle LAN 40 by issuing a command to a notifier constituted by a monitor or buzzer (not shown).

Figure 2:
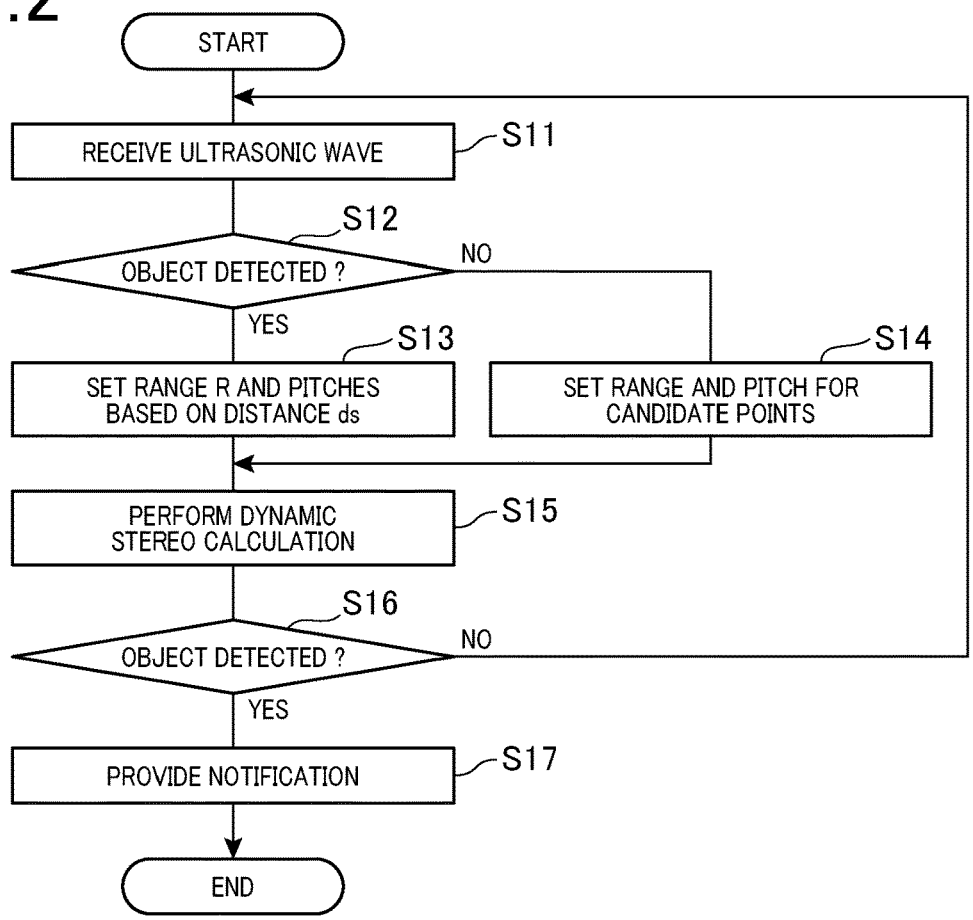
FIG. 2 is a flowchart of an object detection process in the first embodiment.

An operation of the object detection device will be described below. The object detection device detects an object by the ultrasonic sensor 10 and the image sensor 20 both operating together. Specifically, the object detection device detects an object in accordance with steps S11 to S17 shown in FIG. 2.

In step S11, the ultrasonic sensor 10 emits and receives ultrasonic waves. Specifically, the controller 13 of the ultrasonic sensor 10 issues radio transmission commands to the transmitter 12, and the transmitter 12 makes the microphone 11 emit ultrasonic waves by applying an AC voltage to the microphone 11. Upon receiving an ultrasonic wave, the microphone 11 outputs a variable signal depending on the sound pressure of the received ultrasonic wave; the receiver 14 performs a process such as A/D conversion on the output signal of the microphone 11 and outputs it to the distance calculator 15. The distance calculator 15 calculates the distance to an object, by which the ultrasonic wave is reflected, based on the signal inputted by the receiver 14.

Figure 3:
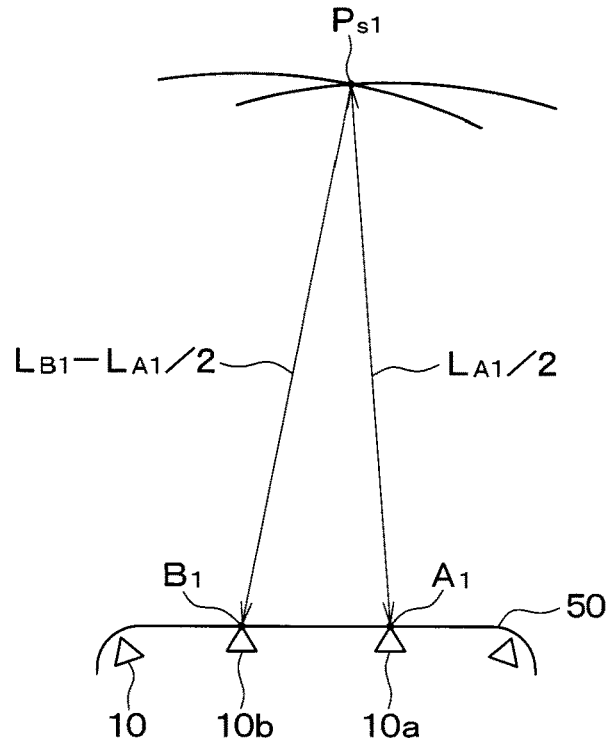
FIG. 3 is a view for reference in describing an operation of an ultrasonic sensor in the first embodiment.

The object detection device in the present embodiment detects the distance to the object by triangulation using two the ultrasonic sensors 10. As illustrated in FIG. 3, a vehicle 50 carries a plurality of the ultrasonic sensors 10, two of which are ultrasonic sensors 10a and 10b; hereinafter, the case in which the ultrasonic sensor 10a emits ultrasonic waves and the ultrasonic sensors 10a and 10b receive ultrasonic waves will be described. The ultrasonic sensors 10a and 10b correspond to a first and second sensor, respectively.

The period of time from an ultrasonic wave is emitted by the ultrasonic sensor 10a until the ultrasonic wave is received by the ultrasonic sensor 10a is represented by a period of time $T_A$; the period of time from an ultrasonic wave is emitted by the ultrasonic sensor 10a until the ultrasonic wave is received by the ultrasonic sensor 10b is represented by a period of time $T_B$. The distance the ultrasonic wave travels during the period of time $T_A$ is represented by a distance $L_{A1}$; the distance the ultrasonic wave travels during is the period of time $T_B$ is represented by a distance $L_{B1}$. The distance between the ultrasonic sensor 10a and the object thus is represented by a distance $L_{A1}/2$; the distance between the ultrasonic sensor 10b and the object is thus represented by a distance $L_{B1}-L_{A1}/2$.

Given a point $A_1$ representing the position of the ultrasonic sensor 10a, a point $B_1$ representing the position of the ultrasonic sensors 10b, and a point $P_{s1}$ representing the position of the object, the point $P_{s1}$ is a point of intersection of: a circle centered at the point $A_1$ with a radius of the distance $L_{A1}/2$; and a circle centered at the point $B_1$ with a radius of the distance $L_{B1}-L_{A1}/2$.

In step S11, the distance calculator 15 of the ultrasonic sensor 10a or 10b, for example, obtains the position of the point $P_{s1}$ using the distances $L_{A1}$ and $L_{61}$, estimates the object to be at the point $P_{s1}$, and calculates the distance to the object.

Here, the object is estimated to be on the same horizontal plane as the ultrasonic sensors 10a and 10b, and the position of the object is calculated. The distance calculator 15 calculates the distance between the point $P_{s1}$ and the midpoint of a line segment $A_1B_1$, as the distance between the vehicle 50 and the object. The distance calculated by the distance calculator 15 is represented by a distance $d_s$.

In step S12, the controller 13 determines whether or not an object is detected by the distance calculator 15, then transmits the result of the determination and the distance $d_s$, which is calculated by the distance calculator 15, to the image sensor 20. For example, when the distance $d_s$ is equal to or less than a predetermined distance, the controller 13 determines that an object is detected; when the distance $d_s$ is longer than the predetermined distance, the controller 13 determines that no object is detected.

If an object is detected according to the determination of step S12, the position calculator 24 performs, in step S13, setting a range R as a detection range based on the distance $d_s$ and setting pitches in and outside the range R. The pitches set herein will be used in step S15 for setting candidate points; the candidate points are spaced more tightly at a smaller pitch.

In the present embodiment, pitches are set such that the candidate points are denser within the region R than outside the region R. In other words, the pitch in the range R is smaller than the pitch outside the range R. Furthermore, the pitch in the range R is smaller than the pitch set in step S14. The range R is, for example, a rectangular range with a predetermined width and height, centered at a point which is the horizontal distance $d_s$ away from the vehicle 50.

If no object is detected according to the determination of step S12, the position calculator 24 performs, in step S14, setting the range, in which candidate points will be arranged, to a predetermined range and setting the pitch for the candidate points to a predetermined pitch. This predetermined range is, for example, larger than the range R set in step S13, and is a range shaped like a rectangular prism, at a predetermined distance from the vehicle 50. The object detection device proceeds to step S15 from step S13 or S14.

In step S15, the image sensor 20 performs Dynamic Stereo calculation. Specifically, the controller 22 issues an image capture command to the camera 21, and the camera 21 captures images around the vehicle 50. At this time, the controller 22 issues a command to make the camera 21 capture two images at a time interval.

The first and second image captured by the camera 21 at the first and second time, respectively, are transmitted to the feature extractor 23. The feature extractor 23 extracts a feature point both from the first and second image, and transmits the positions of the feature points to the position calculator 24.

The position calculator 24 obtains the direction of the object from the camera 21 at the first time, based on the position of the feature point in the first image, then sets multiple candidate points representing the candidate positions of the object. Candidate points are set based on the information set in step S13 or S14.

In other words, if this is after step S13, candidate points are set based on the range R and pitch set in step S13. The candidate points are thus denser within the range R than outside the region R. In the present embodiment, the candidate points in the range R equally spaced by a pitch, and the candidate points outside the range R are equally spaced by a different pitch. The pitch in the range R i.e. the interval between two neighboring candidate points in the range R is less than the pitch outside the range R.

Figure 4:
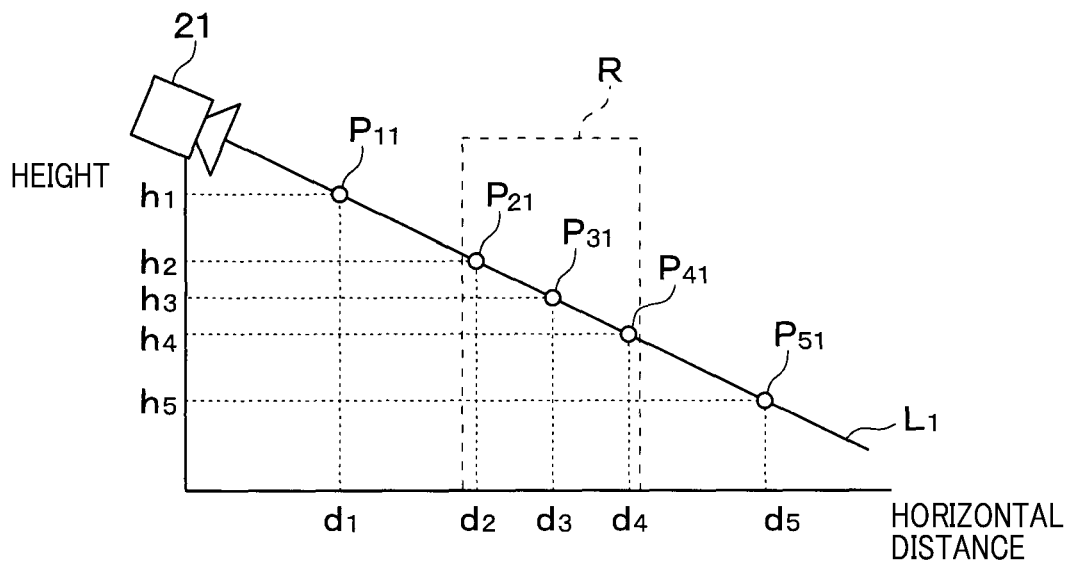
FIG. 4 is a view for reference in describing operation of an image sensor in the first embodiment.

For example, as referred to FIG. 4, when the object is estimated to be in the direction indicated by a line $L_1$, with reference to the position of the feature point, multiple points are set on the line $L_1$ as candidate points. Hereinafter, the case in which five candidate points are set will be described.

The five candidate points are represented by a point $P_{11}$, a point $P_{21}$, a point $P_{31}$, a point $P_{41}$, and a point $P_{51}$, in the order of closest to the camera 21. The points $P_{21}$, $P_{31}$, and $P_{41}$ are included in the range R; the points $P_{11}$ and $P_{51}$ are positioned outside the range R. The interval between the points $P_{11}$ and $P_{21}$ is equal to the interval between the points $P_{41}$ and $P_{s1}$; the interval between the points $P_{21}$ and $P_{31}$ is equal to the interval between the points $P_{31}$ and $P_{41}$. The interval between the points $P_{11}$ and $P_{21}$ and the interval between the points $P_{41}$ and $P_{51}$ are longer than the interval between the points $P_{21}$ and $P_{31}$ and the interval between the points $P_{31}$ and $P_{41}$. The heights of the points $P_{11}$, $P_{21}$, $P_{31}$, $P_{41}$, and $P_{51}$ are represented by a height $h_1$, a height $h_2$, a height $h_3$, a height $h_4$, and a height $h_5$, respectively. The horizontal distances of the points $P_{11}$, $P_{21}$, $P_{31}$, $P_{41}$, and $P_{51}$ from the camera 21 are represented by a distance $d_1$, a distance $d_2$, a distance $d_3$, a distance $d_4$, and a distance $d_5$, respectively.

Six or more candidate points may be set. In addition to the points $P_{11}$ to $P_{51}$, another candidate point may be set such that it is closer to the camera 21 than the point $P_{11}$, for example. In this case, the candidate points are spaced such that the interval between this candidate point and the point $P_{11}$ is equal to the interval between the points $P_{11}$ and $P_{21}$. Alternatively, in addition to the points $P_{11}$ to $P_{51}$, another candidate point may be set such that it is more distant from the camera 21 than the point $P_{51}$, for example. In this case, the candidate points are spaced such that the interval between this candidate point and the point $P_{51}$ is equal to the interval between the points $P_{41}$ and $P_{51}$.

If this is after step S14, multiple candidate points are set such that they are equally spaced in a predetermined range on the line $L_1$.

A vehicle speed sensor not shown in the figure, for example, transmits information about the distance the vehicle 50 had moved from the first time to the second time, to the position calculator 24 by way of the in-vehicle LAN 40 and the controller 22. Based on the information transmitted therefrom, the position calculator 24 estimates the positions of the multiple candidate points at the second time.

Figure 5:
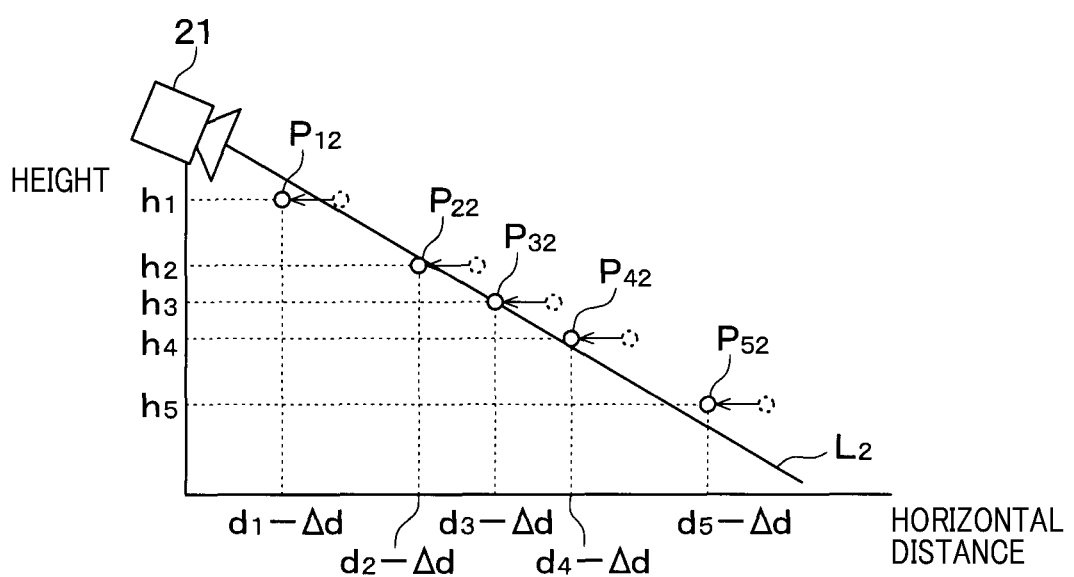
FIG. 5 is a view for reference in describing operation of the image sensor in the first embodiment.

As illustrated in FIG. 5, the five candidate points at the second time, which correspond to the candidate points at the first time, are represented by a point $P_{12}$, a point $P_{22}$, a point $P_{32}$, a point $P_{42}$, and a point $P_{52}$. Given a distance $\Delta d$ representing the horizontal distance the camera 21 travels from the first time to the second time, the position calculator 24 estimates the distances to the points $P_{12}$, $P_{22}$, $P_{32}$, $P_{42}$, and $P_{52}$ at the distance $d_1-\Delta d$, the distance $d_2-\Delta d$, the distance $d_3-\Delta d$, the distance $d_4-\Delta d$, and the distance $d_5-\Delta d$, respectively. Here, the candidate points do not change in height at the first and second time. In other words, the heights of the points $P_{12}$ to $P_{52}$ are represented by the heights $h_1$ to $h_5$, respectively.

The position calculator 24 further obtains the direction of the object at the second time based on the position of the feature point in the second image. In FIG. 5, a line $L_2$ indicates the direction of the object at the second time, which is detected from the second image. The candidate point closest to the line $L_2$ is selected from the points $P_{12}$ to $P_{52}$, and the object is estimated to be at a position corresponding to the candidate point selected therefrom. For example, given the positional relationship of the points $P_{12}$ to $P_{52}$ with respect to the line $L_2$, as illustrated in FIG. 5, the object at the second time is estimated to be at a position corresponding to the point $P_{32}$.

The position calculator 24 further calculates the distance to the object from the vehicle 50 based on the position of the object, which is determined as described above, then transmits it to the ECU 30 by way of the controller 22 and the in-vehicle LAN 40. The distance to the object, which is calculated by the position calculator 24, is represented by a distance $d_c$.

Hereinbefore, candidate points are set after the camera 21 captures two images around the vehicle; alternatively, the camera 21 may capture a second image after the setting of candidate points and other operations.

In step S16, the object determiner 32 determines whether or not an object is detected by the position calculator 24, then transmits the result of the determination to the controller 31. For example, if the distance $d_c$ is equal to or less than a predetermined distance, the object determiner 32 determines that an object is detected; if the distance $d_c$ is longer than the predetermined distance, the object determiner 32 determines that no object is detected.

If an object is detected according to the determination of step S16, then in step S17, the controller 31 warns the driver with a monitor or buzzer, for example, which is not shown in the figure; the object detection process then terminates. If no object is detected according to the determination of step S16, the object detection device proceeds to step S11.

As described above, in the present embodiment, the range R is set based on the distance $d_s$ detected by the ultrasonic sensor 10, and candidate points are set to be denser within the range R than outside the range R. This allows the image sensor 20 to perform calculations with high resolution only on a range close to the position detected by the ultrasonic sensor 10, and thus allows a lower calculational burden than in the case of performing calculations with high resolution on all range from the ground up to the height of the camera 21, for example. Accordingly, achieving higher accuracy in detection is compatible with suppressing an increase in calculational burden.

Furthermore, in the present embodiment, the position of an object is detected by a plurality of the ultrasonic sensors 10, which allows the range R to be further narrowed down and an even lower calculational burden than in the case in which the position thereof is detected by one single the ultrasonic sensor 10.

Second Embodiment

A second embodiment will be described. The present embodiment is different from the first embodiment for its object detection process while it is quite similar to the first embodiment for the other part; only the different part from the first embodiment thus will be described.

In the present embodiment, an object is detected more than once by the ultrasonic sensor 10 and the image sensor 20. If an object has been detected a predetermined number of times, the object is finally determined as being detected, and a notification is provided to the driver.

Figure 6:
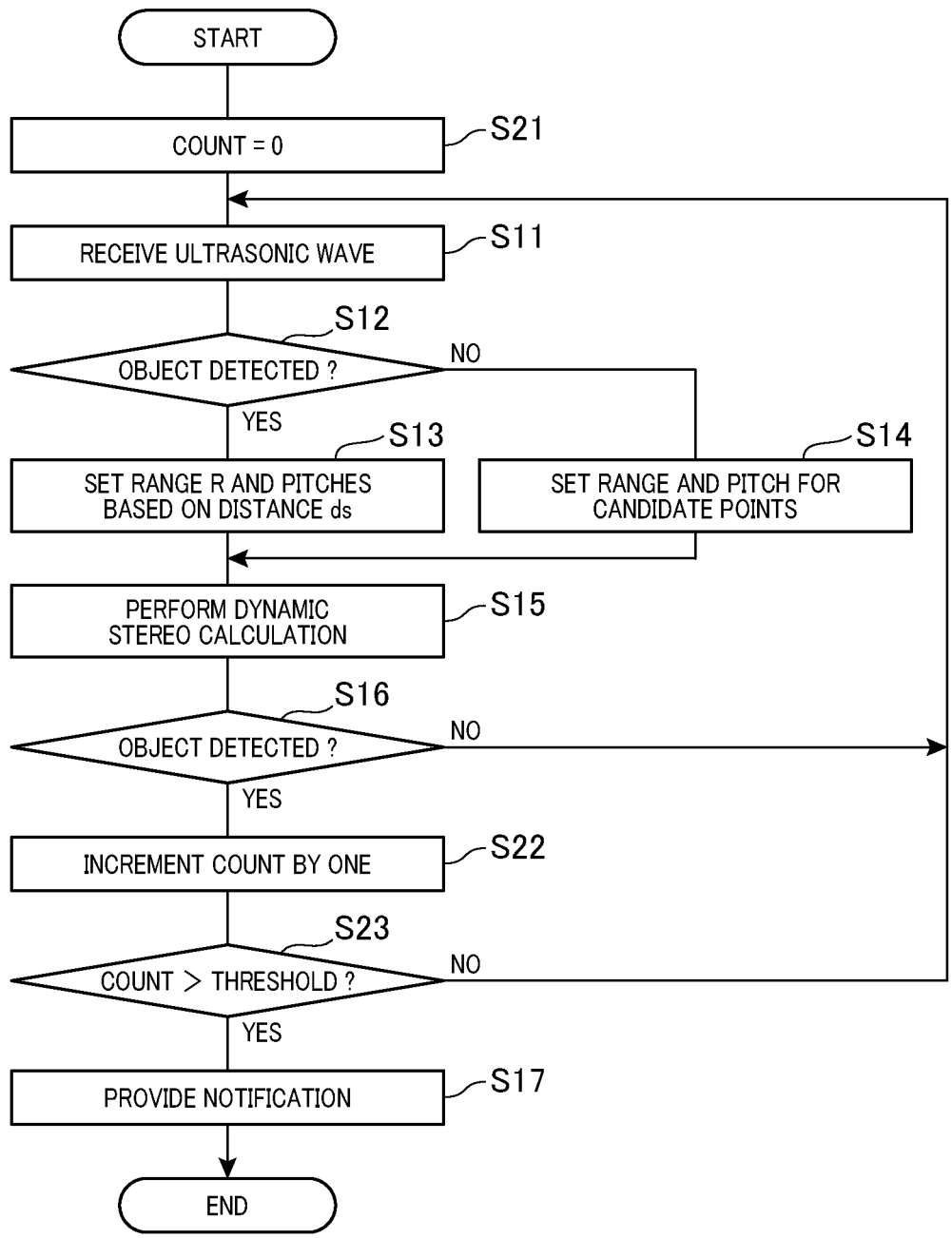
FIG. 6 is a flowchart of an object detection process in a second embodiment.

Specifically, in the present embodiment, step S21 is performed before step S11, as shown in FIG. 6; and the counter, indicating the number of times an object has been detected, is thus reset to zero. If an object is detected according to the determination of step S16, the count of the counter is incremented by one in step S22; then in step S23, the object determiner 32 determines whether or not the count is greater than a predetermined threshold.

If the count is greater than the threshold according to the determination, the object detection device proceeds to step S17, in which an object is finally determined as being detected, and a notification is provided to the driver. If the count is equal to or less than the threshold according to the determination, the object detection device proceeds to step S11, in which the ultrasonic sensor 10 and the image sensor 20 start object detection again.

Repeated execution of an object detection process as described above allows preventing any objects from being erroneously detected.

Third Embodiment

A third embodiment will be described. The present embodiment is different from the second embodiment for its object detection process while it is quite similar to the second embodiment for the other part; only the different part from the second embodiment thus will be described.

In the present embodiment, the distance $d_s$ detected by the ultrasonic sensor 10 is transmitted to the ECU 30 by way of the in-vehicle LAN 40. When the difference between the distances $d_s$ and $d_c$ is small, the determination of the object detection is completed earlier than when the difference between the distances $d_s$ and $d_c$ is large.

Figure 7:
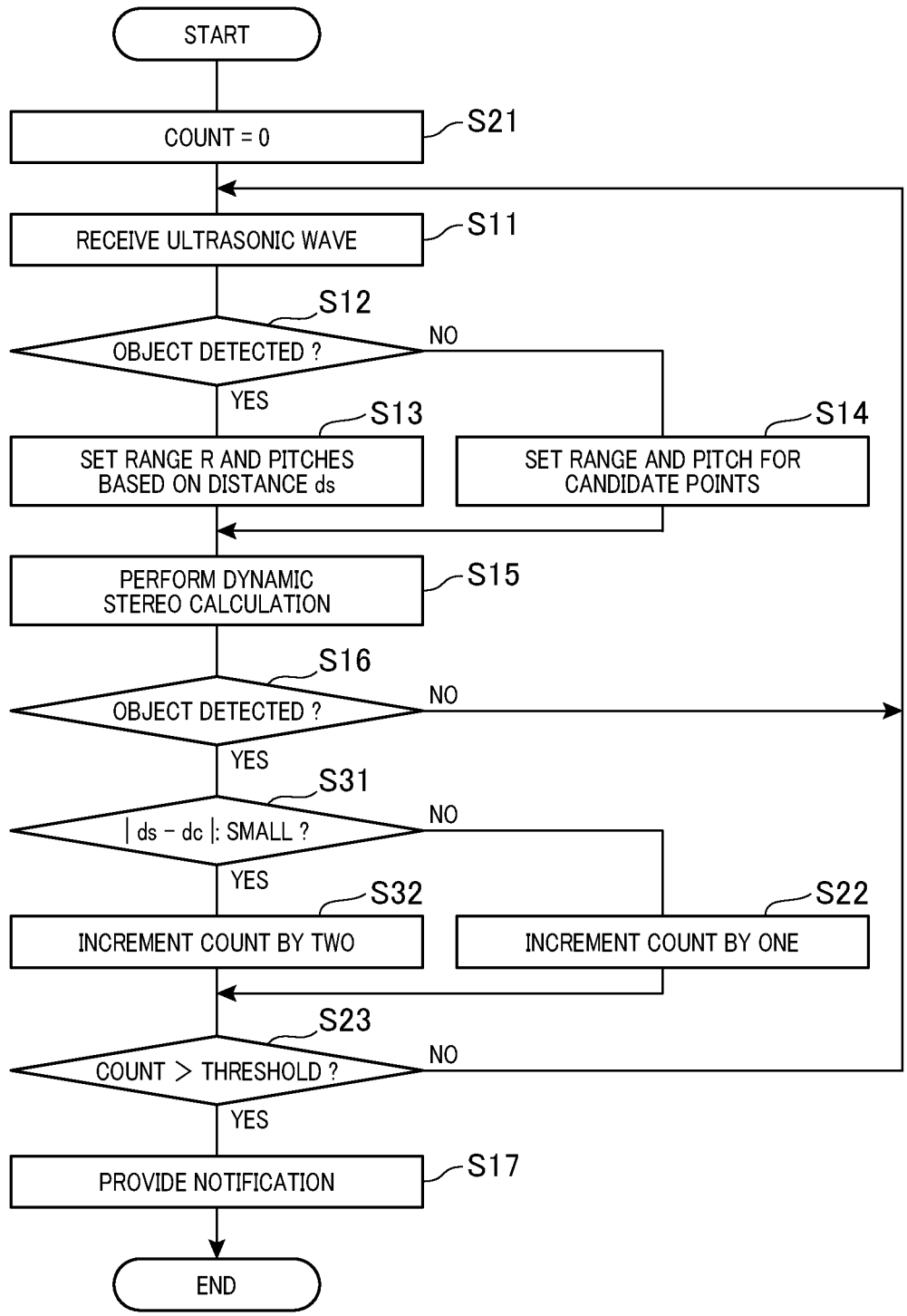
FIG. 7 is a flowchart of an object detection process in a third embodiment.

Specifically, as shown in FIG. 7, the object detection device proceeds from step S16 to step S31, in which the object determiner 32 determines whether or not an absolute value of a difference between the distances $d_s$ and $d_c$ is equal to or less than a predetermined value. If $|d_s-d_e|$ is equal to or less than the predetermined value according to the determination of step S31, the object detection device proceeds to step S32 to increment the count by two, then proceeds to step S23.

If $|d_s-d_c|$ is greater than the predetermined value according to the determination of step S31, the object detection device proceeds to step S22 to increment the count by one, then proceeds to step S23.

By the above-described process, when $|d_s-d_c|$ is small, the determination of object detection is completed earlier than when $|d_s-d_c|$ is large.

When the difference between the distances $d_s$ and $d_c$ is small, it is highly possible that the both sensors have detected the same object, and it can be assumed that the object is in close proximity. So, when the difference between the distances $d_s$ and $d_c$ is small, the determination of object detection is completed earlier; providing the notification to the driver or automatically activating the brakes earlier allows avoiding a collision or another incident with the object.

In the present embodiment, the process before completing the determination of object detection is speeded up by changing a count increment; this process may be speeded up in another manner. For example, when $|d_s-d_c|$ is small, the threshold for the counter in step S23 may be set to a smaller value. Alternatively, when $|d_s-d_c|$ is small, the determination of object detection may be completed without comparing the count to the threshold.

Fourth Embodiment

A fourth embodiment will be described. The present embodiment is different from the first embodiment for its method of detecting an object by the ultrasonic sensor 10 while it is quite similar to the first embodiment for the other part; only the different part from the first embodiment thus will be described.

Figure 8:
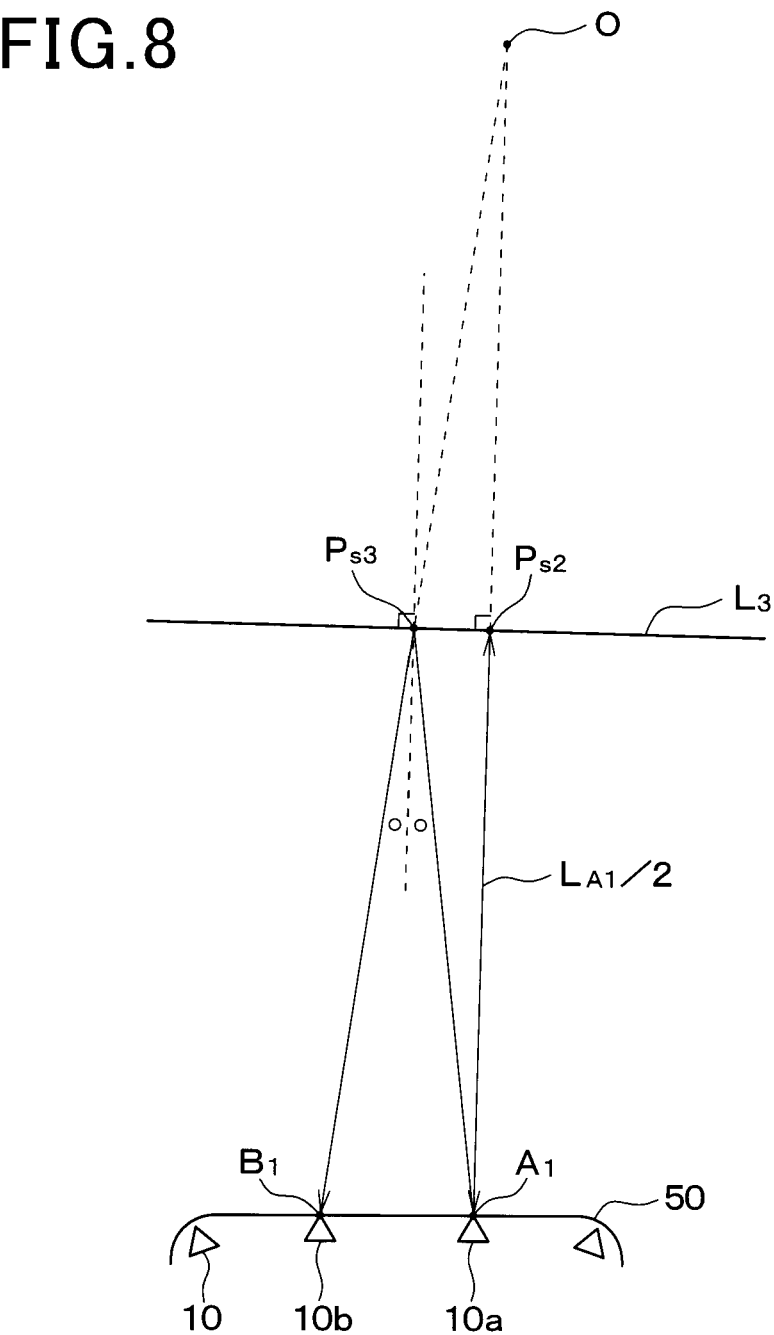
FIG. 8 is a view for reference in describing operation of the ultrasonic sensor in a fourth embodiment.

In the first embodiment, the object is estimated to be a point-like object, and the point $P_{s1}$, representing the position of the object, is detected. According to a method as illustrated in FIG. 8, the object is estimated to be a plane having a width and the position of the object is detected.

Specifically, given a point $P_{s2}$ representing the position at which ultrasonic waves are reflected to return to the ultrasonic sensor 10a, the point $P_{s2}$ is on the circumference of a circle centered at the point $A_1$ with a radius of the distance $L_{A1}/2$. When the object is estimated to be a plane, the plane passes through the point $P_{s2}$ and intersect a line segment $P_{s2}A_1$ at right angles. In FIG. 8, this plane is indicated by a line $L_3$.

In consideration of the relationship between an incidence angle and a reflex angle, a point $P_{S3}$, representing the position at which ultrasonic waves are reflected to return to the ultrasonic sensor 10b, is a point of intersection of the following lines: a line $L_3$; and a line connecting the point $B_1$ and a point reflecting the point $A_1$ over the line $L_3$. Given a point O corresponding to the point reflecting the point $A_1$ over the line $L_3$, the length of a line segment $P_{s3}A_1$ is equal to the length of a line segment $OP_{s3}$; the length of a line segment $OB_1$ is thus represented by the distance $L_{61}$. Accordingly, the point O is a point of intersection of the following circles: a circle centered at the point $A_1$ with a radius of the distance $L_{A1}$; and a circle centered at the point $B_1$ with a radius of the distance $L_{B1}$.

Obtaining the distances $L_{A1}$ and $L_{B1}$ by emitting and receiving ultrasonic waves, the distance calculator 15 defines the point O by a point of intersection of the following circles: a circle centered at the point $A_1$ with a radius of the distance $L_{A1}$; and a circle centered at the point $B_1$ with a radius of the distance $L_{B1}$. The distance calculator 15 further defines the point $P_{s2}$ by the midpoint of a line segment $OA_1$ and the point $P_{s3}$ by a point of intersection of the following lines: a normal line to the line segment $OA_1$, which passes through the point $P_{s2}$; and the line segment $OB_1$. Subsequently, the distance calculator 15 estimates the object to be in a line segment $P_{s2}P_{s3}$, and calculates the distance to the object.

Fifth Embodiment

A fifth embodiment will be described. The present embodiment is different from the first embodiment for its method of detecting an object by the ultrasonic sensor 10 while it is quite similar to the first embodiment for the other part; only the different part from the first embodiment thus will be described.

Figure 9:
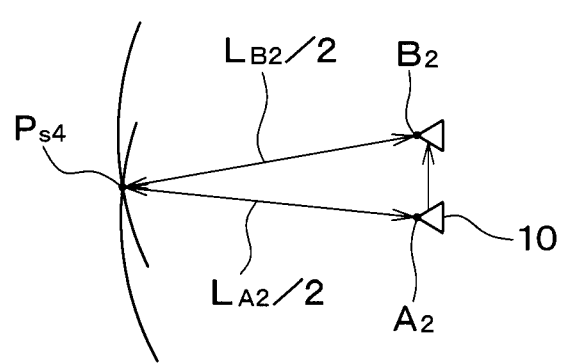
FIG. 9 is a view for reference in describing operation of the ultrasonic sensor in a fifth embodiment.

In the present embodiment, the ultrasonic sensor 10 emits and receives ultrasonic waves two times, before and after the vehicle moves, as illustrated in FIG. 9. Here, the distance to the object is calculated ignoring the distance the ultrasonic sensor 10 moves from the first emission of an ultrasonic wave to the receipt of its reflected wave and the distance the ultrasonic sensor 10 moves from the second emission of an ultrasonic wave to the receipt of its reflected wave.

Given a point $A_2$ representing the position at which the ultrasonic sensor 10 performs the first emission of an ultrasonic wave, and further given a distance $L_{A2}$ representing the distance the ultrasonic wave travels from the first emission of the ultrasonic wave to the receipt of its reflected wave by the ultrasonic sensor 10, the distance between the point $A_2$ and the object is represented by a distance $L_{A2}/2$.

Meanwhile, given a point $B_2$ representing the position at which the ultrasonic sensor 10 performs the second emission of an ultrasonic wave, and further given a distance $L_{B2}$ representing the distance the ultrasonic wave travels from the second emission of the ultrasonic wave to the receipt of its reflected wave by the ultrasonic sensor 10, the distance between the point $B_2$ and the object is represented by a distance $L_{B2}/2$.

The distance calculator 15 estimates the object to be at a point $P_{s4}$, which corresponds to a point of intersection of the following circles: a circle centered at the point $A_2$ with a radius of the distance $L_{A2}/2$; and a circle centered at the point $B_2$ with a radius of the distance $L_{B2}/2$, and calculates the distance to the object.

As described above, in the present embodiment, the distance to the object is calculated by emitting and receiving ultrasonic waves two times, before and after the vehicle moves. As in the first embodiment, this allows the range R to be further narrowed down and an even lower calculational burden.

Sixth Embodiment

A sixth embodiment will be described. The present embodiment is different from the fifth embodiment for its method of detecting an object by the ultrasonic sensor 10 while it is quite similar to the fifth embodiment for the other part; only the different part from the fifth embodiment thus will be described.

Figure 10:
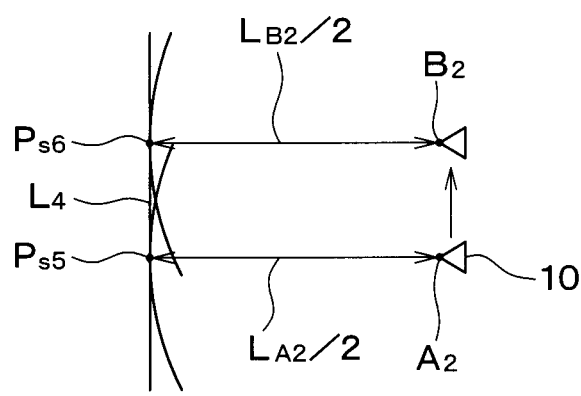
FIG. 10 is a view for reference in describing operation of the ultrasonic sensor in a sixth embodiment.

In the fifth embodiment, the object is estimated to be a point-like object, and the point $P_{s4}$, representing the position of the object, is detected. According to a method as illustrated in FIG. 10, the object is estimated to be a plane having a width and the position of the object is detected, in the case in which ultrasonic waves are emitted and received two times, before and after the vehicle moves.

Specifically, given a point $P_{s5}$ representing the position at which ultrasonic waves are reflected to return to the ultrasonic sensor 10 in the first emission and receipt thereof, the point $P_{s5}$ is on the circumference of a circle centered at the point $A_2$ with a radius of the distance $L_{A2}/2$. Meanwhile, given a point $P_{s6}$ representing the position at which ultrasonic waves are reflected to return to the ultrasonic sensor 10 in the second emission and receipt thereof, the point $P_{s6}$ is on the circumference of a circle centered at the point $B_2$ with a radius of the distance $L_{B2}/2$.

When the object is estimated to be a plane, the plane passes through the points $P_{s6}$ and $P_{s6}$ and intersect a line segment $P_{s5} A_2$ and a line segment $P_{s6}B_2$, at right angles. Given a line $L_4$ representing a common tangent line to the aforementioned two circles, the points of tangency, at which the line $L_4$ touches the aforementioned two circles, are represented by the points $P_{s5}$ and $P_{s6}$.

The distance calculator 15 obtains the positions of the points $P_{s5}$ and $P_{s6}$ using the distances $L_{A2}$ and $L_{62}$ based on the relationships between the distances $L_{A2}$ and $L_{B2}$, the points $P_{s5}$ and $P_{s6}$, and the line $L_4$; the distance calculator 15 estimates the object to be in the line segment $P_{s5}P_{s6}$ and calculates the distance to the object.

Other Embodiments

The present disclosure should not be limited to the embodiments described above and can be modified as deemed appropriate. The above-described embodiments are not independent from one another, and some of them can be combined as deemed appropriate unless such a combination is unreasonable. Needless to say, in the above-described embodiments, the components of the embodiments should not be necessarily deemed to be essential unless explicitly described or they are fundamentally and obviously essential, for example. Furthermore, in the above-described embodiments, any numbers, values, amounts, ranges, and other numeric representations of the components of the embodiments should not be limited to those specified therein unless explicitly described or they are fundamentally and obviously limited to those specified therein. Furthermore, in the above-described embodiments, any forms, positions, and other characteristics of the components of the embodiments should not be limited to those specified therein unless explicitly described or they are fundamentally those specified therein.

For example, when the ultrasonic sensor 10 detects the object, candidate points may be set such that they are only within the range R; such a method of setting candidate points allows a lower calculational burden.

Furthermore, the distance calculator 15 may obtain the frequency of the received waves via quadrature demodulation and calculate the relative speed of the object with respect to the vehicle using the frequency; the position calculator 24 may estimate the positions of the multiple candidate points at the second time, based on the positions of the candidate points at the first time and the relative speed of the object. Furthermore, the range R may be set with reference to the relative speed; for example, the range R may be set to be larger with increasing relative speed of the object.

What is claimed is:

1. An object detection device to be installed to a vehicle and detect an object located outside the vehicle, the object detection device comprising:

an ultrasonic sensor configured to detect a distance to the object by emitting and receiving an ultrasonic wave;

a camera configured to capture a first image around the vehicle at a first time and a second image around the vehicle at a second time which is after the first time;

a non-transitory memory storing one or more computer programs; and a processor executing the one or more programs to:

extract feature points from each of the first and second images; and set multiple candidate points based on the positions of the feature points extracted from the first image, the multiple candidate points representing a candidate position of the object, the multiple candidate points being set to be denser within a detection range than outside the detection range, in which an interval between two neighboring candidate points within the detection range is set to be less than an interval between two neighboring candidate points outside of the detection range, the detection range being set based on the distance detected by the ultrasonic sensor;

estimate positions of the multiple candidate points at the second time, based on the positions of the multiple candidate points extracted from the first image and movement information of the vehicle; and calculate the position of the object by comparing the estimated positions of the multiple candidate points at the second time and the positions of the feature points extracted from the second image.

2. The object detection device according to claim 1, wherein for a state in which an object is detected by the ultrasonic sensor, the multiple candidate points are set to be denser within the detection range than outside the detection range, and for a state in which no object is detected by the ultrasonic sensor, the multiple candidate points are set such that they are equally spaced in a predetermined range.

3. The object detection device according to claim 2, wherein the multiple candidate points are set to be denser within the detection range for a state in which an object is detected by the ultrasonic sensor than for a state in which no object is detected by the ultrasonic sensor.

4. The object detection device according to claim 1, wherein, for a state in which an object is detected by the ultrasonic sensor, the multiple candidate points are set only within the detection range.

5. The object detection device according to claim 1, further comprising an object determiner configured to determine whether or not there is an object located at less than a predetermined distance, based on a result of calculation by the position calculator, wherein, for a state in which an absolute value of a difference between the distance detected by the ultrasonic sensor and a distance to the position of the object calculated by the position calculator is less than a predetermined value, the object determiner speeds up a process which is followed by determining that there is an object located at less than the predetermined distance.

6. The object detection device according to claim 1, wherein the detection range is set to be larger with increasing relative speed of the object with respect to the vehicle.

7. The object detection device according to claim 1, wherein the position calculator is configured to estimate the positions of the multiple candidate points at the second time, based on the positions of the multiple candidate points and a relative speed of the object with respect to the vehicle.

8. The object detection device according to claim 1, comprising a first sensor and a second sensor as the ultrasonic sensor, wherein
the first sensor emits an ultrasonic wave and each of the first and second sensors receives a reflected wave of the ultrasonic wave,
a position of the first sensor is represented by a point $A_1$,
a distance the ultrasonic wave emitted by the first sensor travels until the reflected wave is received by the first sensor is represented by a distance $L_{A1}$,
a position of the second sensor is represented by a point $B_1$,
a distance the ultrasonic wave emitted by the first sensor travels until the reflected wave is received by the second sensor is represented by a distance $L_{B1}$, and
the distance to the object is calculated assuming that the object is located at a position corresponding to a point of intersection of a circle centered at the point $A_1$ with a radius of the distance $L_{A1}/2$ and a circle centered at the point $B_1$ with a radius of the distance $L_{B1}-L_{A1}/2$.

9. The object detection device according to claim 1, comprising a first sensor and a second sensor as the ultrasonic sensor, wherein
the first sensor emits an ultrasonic wave and each of the first and second sensors receives a reflected wave of the ultrasonic wave,
a position of the first sensor is represented by a point $A_1$,
a distance the ultrasonic wave emitted by the first sensor travels until the reflected wave is received by the first sensor is represented by a distance $L_{A1}$,
a position of the second sensor is represented by a point $B_1$,
a distance the ultrasonic wave emitted by the first sensor travels until the reflected wave is received by the second sensor is represented by a distance $L_{B1}$, and
a point of intersection of a circle centered at the point $A_1$ with a radius of the distance $L_{A1}$ and a circle centered at the point $B_1$ with a radius of the distance $L_{B1}$ is represented by a point O,
a midpoint of a line segment $OA_1$ connecting the point O and the point $A_1$ is represented by a point $P_{s2}$,
a point of intersection of a normal line to the line segment $OA_1$, which passes through the point $P_{s2}$, and a line segment $OB_1$ connecting the point O and the point $B_1$ is represented by a point $P_{s3}$, and
the distance to the object is calculated assuming that the object is located at a position corresponding to a line segment $P_{s2}P_{s3}$ connecting the point $P_{s2}$ and the point $P_{s3}$.

10. The object detection device according to claim 1, wherein
the ultrasonic sensor emits and receives an ultrasonic wave at a point $A_2$ before movement of the vehicle,
the ultrasonic sensor emits and receives an ultrasonic wave at a point $B_2$ after the movement of the vehicle,
a distance the ultrasonic wave emitted by the ultrasonic sensor at the point $A_2$ before the movement of the vehicle travels until the reflected wave is received by the ultrasonic sensor is represented by a distance $L_{A2}$,
a distance the ultrasonic wave emitted by the ultrasonic sensor at the point $B_2$ after the movement of the vehicle travels until the reflected wave is received by the ultrasonic sensor is represented by a distance $L_{B2}$, and
a distance to the object is calculated assuming that the object is located at a position corresponding to a point of intersection of a circle centered at the point $A_2$ with a radius of the distance $L_{A2}/2$ and a circle centered at the point $B_2$ with a radius of the distance $L_{B2}/2$.

11. The object detection device according to claim 1, wherein
the ultrasonic sensor emits and receives an ultrasonic wave at a point $A_2$ before movement of the vehicle,
the ultrasonic sensor emits and receives an ultrasonic wave at a point $B_2$ after the movement of the vehicle,
a distance the ultrasonic wave emitted by the ultrasonic sensor at the point $A_2$ before the movement of the vehicle travels until the reflected wave is received by the ultrasonic sensor is represented by a distance $L_{A2}$,
a distance the ultrasonic wave emitted by the ultrasonic sensor at the point $B_2$ after the movement of the vehicle travels until the reflected wave is received by the ultrasonic sensor is represented by a distance $L_{B2}$, and
a common tangent line to a circle centered at the point $A_2$ with a radius of the distance $L_{A2}/2$ and a circle centered at the point $B_2$ with a radius of the distance $L_{B2}/2$ is represented by a line $L_4$,
a point on the tangent line, at which the line $L_4$ touches the circle centered at the point $A_2$ with a radius of the distance $L_{A2}/2$, is represented by a point $P_{s5}$,
a point on the tangent line, at which the line $L_4$ touches the circle centered at the point $B_2$ with a radius of the distance $L_{B2}/2$, is represented by a point $P_{s6}$, and
the distance to the object is calculated assuming that the object is located at a position corresponding to a line segment $P_{s5}P_{s6}$ connecting the point $P_{s5}$ and the point $P_{s6}$.

12. An object detection device to be installed to a vehicle and detect an object located outside the vehicle, the object detection device comprising:
an ultrasonic sensor configured to detect a distance to the object by emitting and receiving an ultrasonic wave;
a camera configured to capture a first image around the vehicle at a first time and a second image around the vehicle at a second time which is after the first time;
a non-transitory memory storing one or more computer programs; and
a processor executing the one or more programs to:
extract feature points from each of the first and second images;
set multiple candidate points based on the positions of the feature points extracted from the first image, the multiple candidate points representing a candidate position of the object, the multiple candidate points being set to be denser within a detection range than outside the detection range wherein an interval between two neighboring candidate points within the range R is less than an interval between two neighboring candidate points outside of the range R, the detection range being set based on the distance detected by the ultrasonic sensor;
estimate positions of the multiple candidate points at the second time, based on the positions of the multiple candidate points extracted from the first image and movement information of the vehicle;
compare the estimated positions of the multiple candidate points at the second time and the positions of the feature points extracted from the second image;

select one of the multiple candidate points at the second
   time having a position closest to a position of one of
   the feature points extracted from the second image;
   and
designate the selected one of the multiple candidate
   points as the object.

\* \* \* \* \*